(12) United States Patent
Bao et al.

(10) Patent No.: US 9,893,822 B2
(45) Date of Patent: Feb. 13, 2018

(54) RADIO LINK PERFORMANCE PREDICTION

(71) Applicant: TELEFONAKTIEBOLAGET LM ERICSSON (PUBL), Stockholm (SE)

(72) Inventors: Lei Bao, Göteborg (SE); Mattias Rydström, Billdal (SE); Anna Rhodin, Pixbo (SE); Per Ligander, Göteborg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/896,432

(22) PCT Filed: Jun. 10, 2013

(86) PCT No.: PCT/EP2013/061902
§ 371 (c)(1),
(2) Date: Dec. 7, 2015

(87) PCT Pub. No.: WO2014/198286
PCT Pub. Date: Dec. 18, 2014

(65) Prior Publication Data
US 2016/0127059 A1    May 5, 2016

(51) Int. Cl.
*H04B 7/04* (2017.01)
*H04B 17/391* (2015.01)
(Continued)

(52) U.S. Cl.
CPC ....... *H04B 17/3913* (2015.01); *H04B 7/0413* (2013.01); *H04B 17/102* (2015.01); *H04B 17/104* (2015.01)

(58) Field of Classification Search
None
See application file for complete search history.

(56) References Cited

U.S. PATENT DOCUMENTS

2011/0268060 A1* 11/2011 Heidari ............... H04B 7/2606
370/329
2012/0051346 A1* 3/2012 Herbert ............ H04L 29/12028
370/338

(Continued)

FOREIGN PATENT DOCUMENTS

EP        2 557 830 A1    2/2003

OTHER PUBLICATIONS

Mesud Hadziali C et al. System-level gains introduced to 3G UMTS mobile networks by multi-antenna techniques. Telecommunications (BIHTEL). 2012 IX International Symposium on. IEEE. Oct. 25, 2012 (Oct. 25, 2012).

(Continued)

*Primary Examiner* — Brandon Renner (57) ABSTRACT

A method for predicting the performance of a Line-Of-Sight, LOS, multiple-input multiple-output, MIMO, radio link, the method comprising the steps of determining a single-input single-output, SISO, radio link operating condition comprising a SISO system gain, and calculating a LOS-MIMO incremental gain of the LOS-MIMO radio link, as well as modifying the determined SISO radio link operating condition by accounting for the calculated LOS-MIMO incremental gain in the SISO system gain to obtain a LOS-MIMO radio link operating condition comprising a LOS-MIMO system gain, and also obtaining a set of operating condition requirements of the LOS-MIMO radio link. The method also comprising the step of predicting the LOS-MIMO radio link performance by comparing the LOS-MIMO radio link operating condition to the operating condition requirements of the LOS-MIMO radio link.

18 Claims, 6 Drawing Sheets

(51) Int. Cl.
*H04B 17/10* (2015.01)
*H04B 7/0413* (2017.01)

(56) References Cited

U.S. PATENT DOCUMENTS

| | | | | |
|---|---|---|---|---|
| 2013/0195467 A1* | 8/2013 | Schmid | ................ | H04B 1/0096 |
| | | | | 398/115 |
| 2013/0309976 A1* | 11/2013 | Koren | .................. | H04B 7/0473 |
| | | | | 455/63.4 |
| 2016/0006489 A1* | 1/2016 | Rydstrom | ............ | H04B 7/0413 |
| | | | | 375/267 |

OTHER PUBLICATIONS

Hajime Suzuki. Actual and predicted coverage of multiuser MIMO based fixed wireless access in rural areas. GLOBECOM Workshops (GC Wkshps). 2012 IEEE. IEEE. Dec. 3, 2012 (Dec. 3, 2012).

* cited by examiner

RADIO LINK PERFORMANCE PREDICTION

TECHNICAL FIELD

The present disclosure relates to a method and a tool for predicting the performance of a Line-Of-Sight, LOS, multiple-input multiple-output, MIMO, radio link prior to deployment.

BACKGROUND

Line-Of-Sight, LOS, multiple-input multiple-output, MIMO, is a technology with potential to drastically increase throughput in point-to-point radio communication links, e.g., microwave radio links used in a backhaul network.

A radio link with LOS-MIMO technology exploits multiple transmit and multiple receive antennas in order to increase data throughput in a point-to point communication link. By using more than one transmit and more than one receive antenna, the technology enables the simultaneous transmission of several parallel data streams over spatially multiplexed radio links super-imposed on the point-to point communication link. This is in contrast to a conventional radio link with a single transmit and a single receive antenna, where only one data stream can be transmitted over the hop at any given time.

Most radio link communication networks, and microwave frequency radio link communication networks in particular, henceforth referred to as 'radio networks' need to be planned before being deployed. Planning of a radio network is done, e.g., in order to ensure that individual radio links do not suffer extensive interference from each other, and also to ensure that radio links can expect a sufficient signal to noise ratio, SNR. However, perhaps most importantly, radio link planning is done in order to give estimates of radio link availability, i.e., estimates of link down-time. This is done in order to ensure that operator demands on availability are met, as customer satisfaction with the network is to a large extent dependent on network outage and down-time.

A crucial component in radio planning is a planning tool which comprises models of how radio links are expected to behave given certain radio link operating conditions such as link distance, rain intensity, etc. Such models are then used by the tool in order to give a user of the tool a prediction of radio network performance, often comprising availability, given a set of input parameters.

The International Telecommunications Union, ITU, and others, have developed extensive models of link availability and also radio network planning tools for user support in the deployment of radio link networks based on single-input single-output, SISO, radio links and cross-polar interference cancellation, XPIC, radio links. Such models are readily available in the prior art.

The ITU and others have also developed statistical models for the behavior of SISO propagation gain, i.e., statistical models of received signal power given transmitted signal power. These models are readily available in the prior art will henceforth be referred to as SISO attenuation models. See, e.g., ITU-R P.530-14 "Propagation data and prediction methods required for the design of terrestrial line-of-sight systems", and ITU-T G.827 "Availability performance parameters and objectives for end-to-end international constant bit-rate digital paths".

In some SISO attenuation models, the refractivity gradient and the geoclimatic factor (K factor) constitute required input parameters. Such parameters are available from databases which are indexed by the radio link location. Thus, given the geographic location of a future radio link deployment, data on, e.g., refractivity gradient and the geoclimatic factor can be obtained.

However, the models and tools discussed above do not cover the availability and outage estimation of LOS-MIMO radio links.

Hence, there is a need for a method to model LOS-MIMO link availability, and also a network planning tool with support for LOS-MIMO radio links.

SUMMARY

An object of the present disclosure is to provide at least a method and a tool which seeks to mitigate, alleviate, or eliminate one or more of the above-identified deficiencies in the art and disadvantages singly or in any combination and to provide a method and a tool for LOS-MIMO radio link performance prediction, estimation and network planning.

This object is obtained by a method for predicting the performance of a Line-Of-Sight, LOS, multiple-input multiple-output, MIMO, radio link. The method comprises the steps of determining a single-input single-output, SISO, radio link operating condition comprising a SISO system gain, and also the step of calculating a LOS-MIMO incremental gain of the LOS-MIMO radio link. The method further comprises the steps of modifying the determined SISO radio link operating condition by accounting for the calculated LOS-MIMO incremental gain in the SISO system gain to obtain a LOS-MIMO radio link operating condition comprising a LOS-MIMO system gain. The method also comprises obtaining a set of operating condition requirements of the LOS-MIMO radio link, as well as the step of predicting the LOS-MIMO radio link performance by comparing the LOS-MIMO radio link operating condition to the operating condition requirements of the LOS-MIMO radio link.

Thus, by the disclosed method, a LOS-MIMO radio link operating condition is obtained. Based on this operating conditions a number of performance metrics can be derived. Examples of such performance metrics include expected throughput of the LOS-MIMO radio link, and expected outage of the LOS-MIMO radio link.

According to an aspect, the method further comprises the step of obtaining a first set of parameters comprising a radio link transmit power and a radio link propagation distance, and the SISO radio link operating condition is determined based on the first set of parameters.

According to an aspect, the method also comprises the step of obtaining a second set of parameters comprising a LOS-MIMO phase difference distribution, and the step of calculating the LOS-MIMO incremental gain further comprises calculating a LOS-MIMO incremental gain distribution based on the LOS-MIMO phase difference distribution.

Thus, a statistical model of the LOS-MIMO operating condition is obtained based on the first and the second set of input parameters. Since a LOS-MIMO phase difference distribution instead of a LOS-MIMO fixed phase is used for calculating the LOS-MIMO incremental gain, a statistical model is obtained which reflects also an uncertainty in the determined LOS-MIMO radio link operating condition.

According to an aspect, the method further comprises determining an expected outage of the LOS-MIMO radio link by comparing the LOS-MIMO radio link operating condition to the operating condition requirements of the LOS-MIMO radio link.

Thus, a network planner or similar user of the method may employ the disclosed method in order to estimate an expected outage in a future radio link deployment based on LOS-MIMO technology.

According to an aspect, the second set of parameters comprises an antenna geometry of the LOS-MIMO radio link.

According to an aspect, either or both of the first and second set of parameters comprises either of weather pattern data and refractivity data of the LOS-MIMO radio link. The weather pattern data comprises at least one out of rain pattern data, wind pattern data, and snow pattern data.

A benefit of using weather data and refractivity data in order to determine the LOS-MIMO radio link operating condition is that this type of data is readily available from existing databases, since it is used by existing tools for radio link network planning.

According to an aspect, the step of calculating the LOS-MIMO incremental gain is based on either or both of the weather pattern data and the refractivity data of the LOS-MIMO radio link.

According to an aspect, the method further comprises the step of measuring at least one representative phase difference distribution of at least one representative radio link site, and the step of obtaining a second set of parameters also comprises processing the at least one representative phase difference distribution to obtain the LOS-MIMO phase difference distribution.

As will be explained in the following detailed description, the availability and outage of a LOS-MIMO radio link is to a large extent dependent on relative propagation phase angles between transmit and receive antennas. The measurement of such phase angles is not straight forward since independent receiver phase noise distorts phase measurement. Aspects of the disclosed method comprises ways to obviate the problem with phase noise, and to provide accurate measurements of representative phase difference distributions despite the presence of transmit and receive phase distortion.

The object stated above is also obtained by a tool for predicting the performance of a Line-Of-Sight, LOS, multiple-input multiple-output, MIMO, radio link. The tool comprises a determiner unit arranged to determine a single-input single-output, SISO, radio link operating condition comprising a SISO system gain. The tool also comprises a calculator unit arranged to calculate a LOS-MIMO incremental gain. The determiner unit is further arranged to also determine a LOS-MIMO radio link operating condition comprising a LOS-MIMO system gain based on the LOS-MIMO incremental gain. The tool is further arranged to obtain a set of operating condition requirements of the LOS-MIMO radio link via an input interface of the tool. The tool also comprises a predictor unit arranged to predict the LOS-MIMO radio link performance by comparing the LOS-MIMO radio link operating condition to the operating condition requirements of the LOS-MIMO radio link.

Thus, by the disclosed tool, a LOS-MIMO radio link operating condition can be determined. The operating condition can then be compared to the set of requirements on operating condition in order to predict the performance of a future LOS-MIMO radio link. The performance of the radio link according to aspects comprises outage of the radio link. Consequently, radio link network planning in order to ensure that requirements on outage are met is made possible by the disclosed tool.

According to an aspect, the determiner unit is further arranged to determine the LOS-MIMO radio link operating condition comprising the LOS-MIMO system gain by accounting for the calculated LOS-MIMO incremental gain in the SISO system gain to obtain the LOS-MIMO system gain.

According to an aspect, the tool is also arranged to also obtain a first set of parameters via the input interface. The first set of parameters comprises a radio link transmit power and a radio link propagation distance. The determiner unit is further arranged to determine the single-input single-output, SISO, radio link operating condition based on the first set of parameters.

According to an aspect, the tool is arranged to also obtain a second set of parameters via the input interface. The second set of parameters comprises a LOS-MIMO phase difference distribution, and the calculator unit is arranged to calculate a distribution of the LOS-MIMO incremental gain based on the LOS-MIMO phase difference distribution.

According to an aspect, the tool is also arranged to assist in the deployment of a radio link network by using, in the predictor unit, the predicted LOS-MIMO radio link performance to determine an expected outage of at least one LOS-MIMO radio link.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

Aspects of the present disclosure will be described more fully hereinafter with reference to the accompanying drawings. The tool and the method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

The performance of a radio link can be measured by a variety of performance metrics including throughput in terms of bits per second and Hz, and outage or availability measured for instance as the number of minutes per year the radio link is operating below a pre-determined throughput (reduced throughput) or as the number of minutes per year the radio link does not transport information at all (total link outage).

The performance of a radio link is influenced by many factors, which factors comprise both hardware parameters such as mean time between failure of different components and transmitter output power, and also environmental parameters which influence the operating conditions of the radio link.

Herein, operating conditions are to be construed as the conditions under which radio transmission and reception, followed by decoding of the transmitted information data takes place. Thus, the statistical distribution of received signal power is an important part of the radio link operating conditions. Other important parts of the radio link operating condition is the occurrence and severity of frequency selective fading due to, e.g., multipath propagation, and the severity of non-frequency selective fading due to, e.g., rain or fog. Also, the noise power, e.g., additive white Gaussian noise power, in the signal received by a receiver is often an important component of the operating conditions.

Figure 1A:
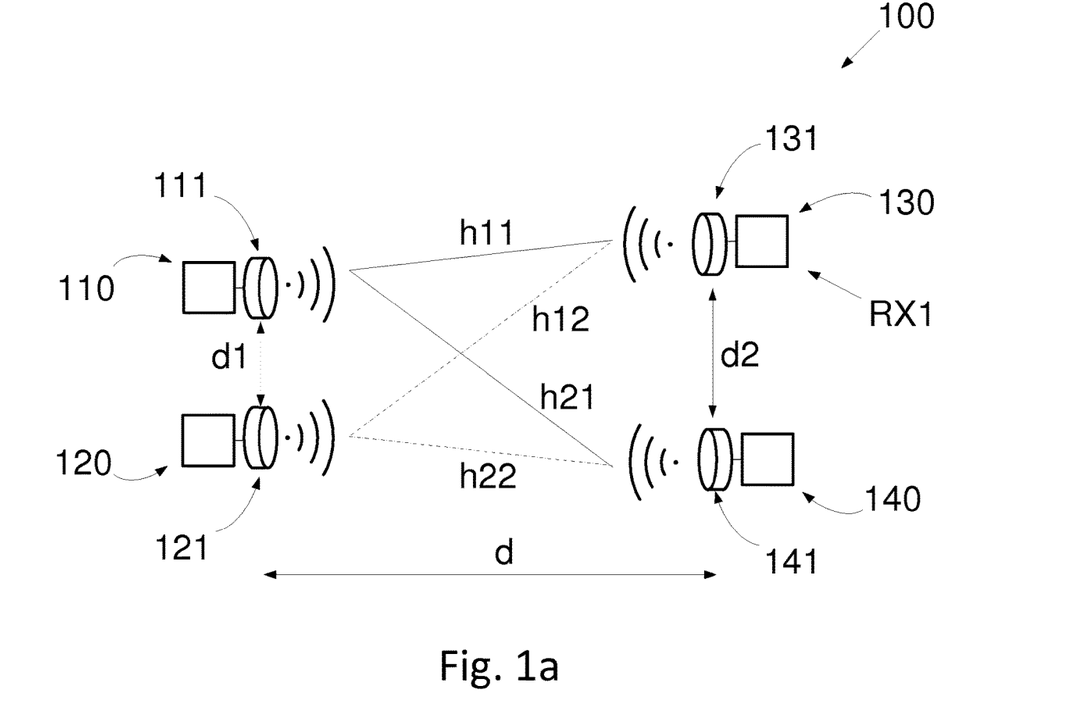
FIG. 1a shows a schematic overview of a LOS-MIMO radio link.

FIG. 1a shows a spatially separated 2×2 LOS-MIMO microwave radio link 100. There are two transceivers 110, 120 at a first end of the radio link 100, which in FIG. 1a is the left side of the drawing, and two transceivers 130, 140 at a second end of the radio link 100, which in FIG. 1a is the right side of the drawing. Each transceiver 110, 120, 130, 140 is connected to an antenna 111, 121, 131, 141. The radio link distance from the first end to the second end is d meters.

A LOS-MIMO modem, not shown in FIG. 1a, is connected at both ends of the radio link 100 arranged to detect information signals transmitted over the radio link 100.

In the following, a detailed description of a method to determine the performance of a LOS-MIMO radio link will be given based on the perspective of a single receiver. This single receiver is shown in FIG. 1a as RX1 located in the top right transceiver 130. However, the same method applies to all the receivers of all transceivers 110, 120, 130, 140 in the LOS-MIMO configuration. Furthermore, it is assumed that any of the transmitters at one end of the radio link can communicate with any of the receivers at the other end of the radio link.

As will be detailed below, the relative position of the transceiver antennas 111, 121, 131, 141 is an important parameter which will contribute to determining the operating conditions and performance of the radio link. In FIG. 1a, the relative antenna distances at either end of the radio link is shown as d1 and d2. However, it should be noted that a LOS-MIMO radio link installation need not be symmetrical as shown in FIG. 1a, but can be asymmetrical also, in which case the three-dimensional coordinates of the transceiver antennas 111, 121, 131, 141 will contribute to determining the operating conditions performance of the radio link.

Consider receiver RX1. It receives signals transmitted from transceivers 110, 120 at the first end of the radio link. An information signal is received from the top left transceiver 110 which is to be detected, while an interference signal is received from the bottom left transceiver 120.

Transmitted signals propagate along four propagation paths, shown in FIG. 1a as h11, h21, h12, and h22. Each path is associated with a path loss, i.e., an attenuation, and also a phase shift.

For each such propagation path, the free space path loss L is given by $$L = G_t + G_r - 20\log_{10}\left(\frac{4\pi df}{c}\right) \text{dB},$$

where d is the link distance, f is the carrier frequency, c is the speed of light, $G_t$ and $G_r$ are the transmitter and receiver antenna gains. The received power $P_{RX}$ measured in dBm at RX1 from the top left transceiver, is related to path loss as $$P_{RX} = P_{TX} - L - A \text{ dBm},$$

where A represents power attenuation due to fading, such as flat fading and frequency selective multipath fading, and $P_{TX}$ represents transmitted power, in this case from the upper left transmitter in FIG. 1a.

Herein, the sum −L−A will henceforth be referred to as the SISO system gain. Thus, herein system gain is often negative.

As mentioned above, statistical models of $P_{RX}$ in the form of SISO attenuation models, are readily available in the prior art. Such models can be applied individually to the propagation paths h11, h12, h21, and h22 to model the expected signal attenuation over said propagation paths.

However, in a LOS-MIMO system, such as the LOS-MIMO system 100 shown in FIG. 1a, not only the magnitudes of the propagation paths h11, h12, h21, and h22 influence the operating condition of the LOS-MIMO system, but also the relative phase-shifts incurred by propagation along the different propagation paths. This effect will give rise to a LOS-MIMO incremental gain which will be a function of the relative phase-shifts incurred by propagation along the different propagation paths.

In an ideal LOS-MIMO system the relative phase differences between information signal and interference signals received at the different antennas are such that maximum LOS-MIMO incremental gain is obtained on one path when interference from other paths are cancelled at the receiver. If path phases deviate from these optima the LOS-MIMO incremental gain drops and consequently the LOS-MIMO system gain is also reduced. Note that the LOS-MIMO incremental gain can be negative, or even approach negative infinity when measured in dB, i.e., zero gain in linear scale.

Figure 1B:
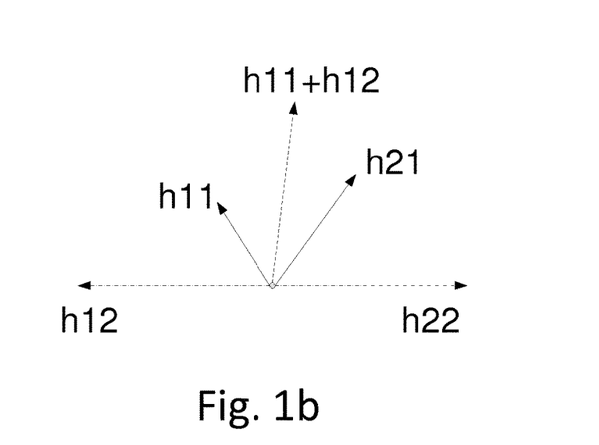
FIG. 1b shows a vector representation of signals received in a LOS-MIMO receiver.

This is illustrated in FIG. 1b, where a vector signal representation of received signals in the LOS-MIMO system 100 is shown. Here the length of a vector illustrates received signal power on a given path, modeled, e.g., by said SISO attenuation models, while the angle of the vector represents received signal phase.

In FIG. 1b, interference signals on propagation paths h12 and h22 have been aligned in phase and amplitude such as to cancel each other, corresponding to a detection of an information signal propagating along paths h11 and h21. Consequently, the remaining signals on propagation paths h11 and h21 comprises information signal, and the total received information signal power is the sum of those signal components, i.e., signal components corresponding to propagation paths h11 and h21, marked in FIG. 1b as a dashed-line vector.

It is the magnitude of the sum vector h11+h21 which determine at least part of the operating condition of the receiver RX1. This is because the magnitude of the sum vector h11+h21 is related to received signal power, and thus partly determines the SNR operating condition of the radio link.

It is thus understood that the relative phase angles in addition to the magnitudes of propagation paths h11, h22, h12, and h21 together contribute to determining the received signal power distribution of an information signal transmitted from the first end of the radio link to the second end of the radio link.

Thus, a key concept of the present disclosure is that, in order to determine the operating conditions of a LOS-MIMO radio link, which comprises determining the distribution of received power as seen by a receiver of the LOS-MIMO radio link, it is required to have an estimate or a model of the distribution of individual propagation attenuations, as well as the relative phases of propagation paths, henceforth referred to as the LOS-MIMO phase difference.

According to an aspect, the magnitudes of the propagation paths constitute random variables which are modeled by statistical SISO attenuation models. The LOS-MIMO phase difference is also a random variable which will be distributed, not necessarily symmetrically, with a variance around an expected LOS-MIMO phase difference.

According to an aspect, the LOS-MIMO phase distribution is obtained by measuring at least one representative LOS-MIMO phase distribution at an existing radio link, and using the at least one representative LOS-MIMO phase distribution to model the phase distribution of the radio link which is to be deployed.

The expected value, i.e., the mean value of the LOS-MIMO phase difference is determined by the LOS-MIMO antenna geometry. Let $\varphi_\Delta$ (in degrees) be the LOS-MIMO phase difference of information signal components propagating on paths h11 and h21 after phase alignment of interference components propagating over paths h12 and h22. The expected value of the LOS-MIMO phase difference can be calculated as $$\varphi_\Delta = ((r_{21} - r_{11}) + (r_{12} - r_{22})) * \frac{360}{\lambda} - 180,$$

Where $r_{xy}$ is the propagated distance along path $h_{xy}$, i.e. the length of path $h_{xy}$ in meters, and $\lambda$ is the wavelength at the center or carrier frequency of the transmitted signal in meters. Thus, the phase shift of each propagation path is a function of the propagation path distance, and the carrier frequency of the transmitted signal.

By defining the MIMO phase difference as the angle difference between received information signal components after cancelling interference components, it is possible to relate the propagation channel phase-shifts to the LOS-MIMO incremental gain, i.e., the magnitude of the sum of components marked by h11 and h21 in FIG. 1b.

In the determining of the LOS-MIMO operating condition, and in particular the LOS-MIMO system gain, the LOS-MIMO incremental gain is considered to be an additional power factor due to the current LOS-MIMO antenna configuration. Thus, according to an aspect, the received power $P_{RX-MIMO}$ in a LOS-MIMO system is modeled as $$P_{RX-MIMO} = P_{TX} - L - A + G_{MIMO} \text{ dBm,}$$

Where $G_{MIMO}$ is the LOS-MIMO incremental gain, and $G_{MIMO} - L - A$ constitutes the LOS-MIMO system gain.

According to one aspect, the LOS-MIMO incremental gain assuming all received signals are equally strong, is $$G_{MIMO} = 20 \cdot \log_{10}(2|\sin(\pi/2 - \varphi_\Delta/2)|), \text{ measured in dB.}$$

According to another more general aspect, received signal components having propagated along different paths, i.e., h11, h12, h21, and h22 are of varying magnitude, affecting the LOS-MIMO system gain.

As mentioned earlier, an ideal LOS-MIMO system maintains $\varphi_\Delta = 0$ degrees at all times, thus providing a constant LOS-MIMO incremental gain of 3 dB in case of equal propagation path attenuation. A deviation from a zero LOS-MIMO phase difference causes degradation in performance due to loss in receive power. Deviations from optimum LOS-MIMO phase difference can be caused by sub-optimal antenna installation, but also from, e.g., frequency selective fading that may cause different phase shifts on the different propagation paths, or from weather phenomena causing changes in refractivity.

Hence, the LOS-MIMO incremental gain has a deterministic part, determined by the antenna geometry, and a random part, caused by, e.g., frequency selective fading and weather conditions.

Throughout this disclosure, said deterministic part of the LOS-MIMO incremental gain is referred to as the expected LOS-MIMO incremental gain.

According to an aspect, the operating condition of a LOS-MIMO radio link is determined by considering the expected operating characteristics of a SISO link deployed in the same location and over the same distance. The operating condition is then modified by adjusting the operating condition of the SISO radio link by the LOS-MIMO incremental gain.

Consequently, if a SISO radio link received power has a pre-determined distribution $P_{RX}$, then the corresponding LOS-MIMO received power distribution $P_{RX-MIMO}$ is given by the convolution of distributions of SISO received power and the distribution of LOS-MIMO incremental gain.

In the calculation of SISO radio link outage probability, $\overline{P}_{siso}$, as put forth, e.g., by the ITU, three dominant factors are often considered: outage due to rain, outage due to flat fading (non-selective fading) and outage due to frequency selective fading, thus the probability of outage in a SISO radio link is given by $$\overline{P}_{siso} \approx \overline{P}_{rain} + \overline{P}_{ns} + \overline{P}_s.$$

Where the probabilities $\overline{P}_{rain}$ represents outage due to rain, $\overline{P}_{ns}$ represents outage due to flat fading, and $\overline{P}_s$ represents outage due to frequency selective fading. The above mentioned probabilities represent the probability that the received signal power will drop by more than a pre-determined fading margin.

According to an aspect, the fading margin used for predicting the performance of a SISO radio link is adjusted by the expected LOS-MIMO incremental gain, which as discussed above is influenced, e.g., by the geometry of antenna installation. This modification applies to all three terms $\overline{P}_{rain}$, $\overline{P}_{ns}$ and $\overline{P}_s$.

To exemplify, if the fading margin of a SISO radio link is calculated to be 10 dB, and a LOS-MIMO incremental gain of 3 dB is calculated, then the corresponding fading margin used for deriving LOS-MIMO radio link outage will be 13 dB. Consequently, as the LOS-MIMO system gain drops the predicted outage probability will increase.

According to an aspect, the fading margin used for deriving $\overline{P}_{ns}$ and $\overline{P}_s$ will become a random variable due to the randomness of the LOS-MIMO incremental gain caused by, e.g., multipath fading. Accordingly, the statistics of the fading margin is specified by the statistics of LOS-MIMO system gain.

It is a key concept the present disclosure to adapt this type of outage model to a LOS-MIMO outage model by using a calculated LOS-MIMO incremental gain derived from a representative LOS-MIMO phase distribution or from a theoretical model of LOS-MIMO phase distribution.

According to an aspect, the fading margin the SISO outage model which is used to determine the above probabilities will be adjusted to account for the LOS-MIMO antenna geometry and the distribution of relative phases of signal propagation paths, i.e., the distribution of the LOS-MIMO incremental gain.

According to an aspect, the LOS-MIMO incremental gain distribution is determined by measuring at least one representative phase difference distribution. Equipment suitable for measuring such a phase difference distribution is also disclosed herein and will be discussed in more detail in connection to FIG. 6 below.

Figure 2:
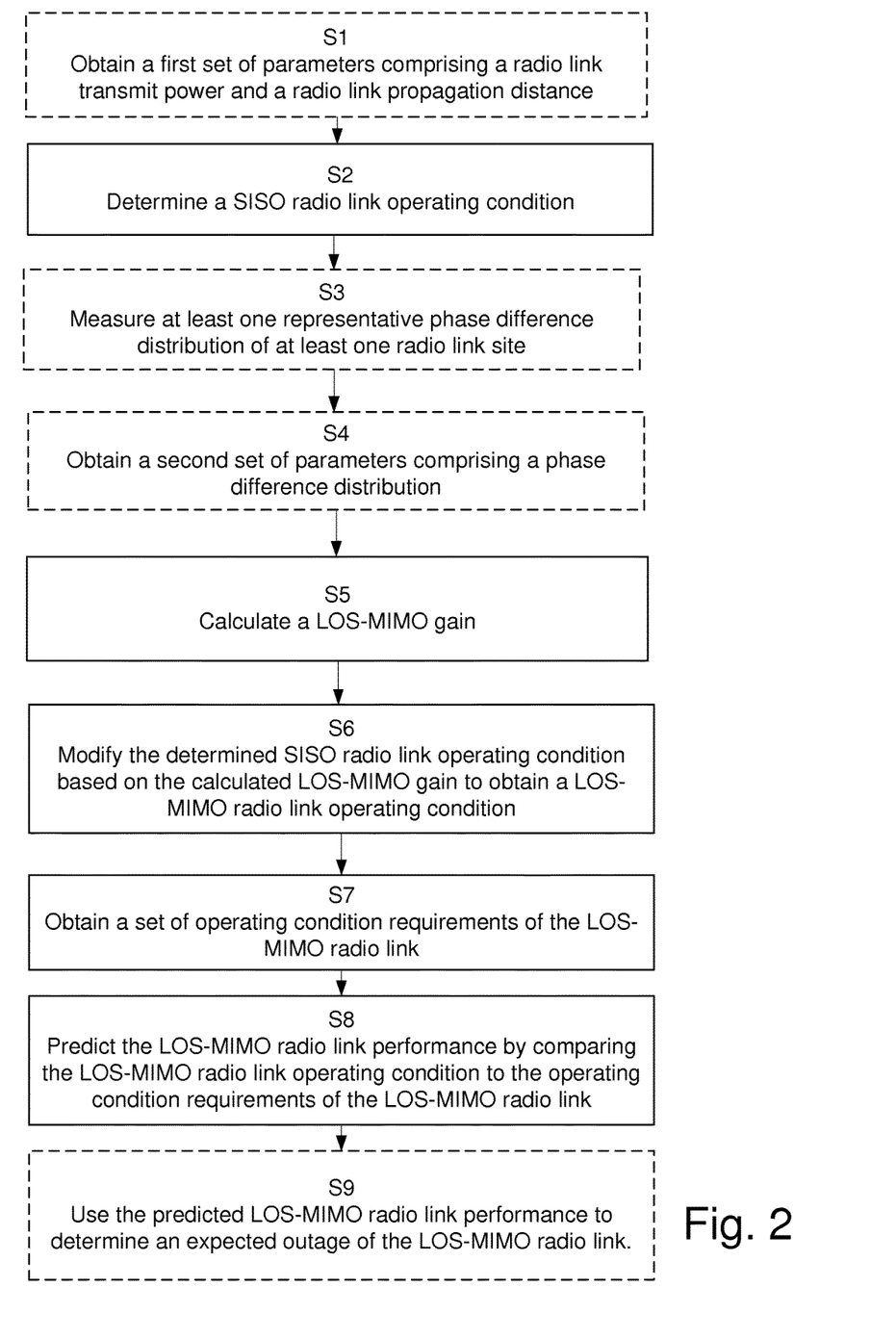
FIGS. 2-4 are flowcharts illustrating aspects of a method of the disclosure, and FIG. 5 schematically shows a block diagram of a tool of the disclosure.

FIG. 2 shows a flowchart illustrating a method for predicting the performance of a Line-Of-Sight, LOS, multiple-input multiple-output, MIMO, radio link.

The method comprises the step of determining S2 a single-input single-output, SISO, radio link operating condition comprising a SISO system gain. This step, according to aspects of the disclosure, comprises determining or otherwise obtaining models of path loss for individual propagation paths from a single transmitter antenna to a single receiver antenna.

The method shown in FIG. 2 also comprises the step of calculating S5 a LOS-MIMO incremental gain of the LOS-MIMO radio link. As discussed above, this step according to some aspects comprises obtaining a MIMO phase difference distribution, for instance by measurement of representative such phase distributions. The method also comprises the step of modifying S6 the determined SISO radio link operating condition by accounting for the calculated LOS-MIMO incremental gain in the SISO system gain to obtain a LOS-MIMO radio link operating condition comprising a LOS-MIMO system gain, and also obtaining S7 a set of operating condition requirements of the LOS-MIMO radio link.

Such operating condition requirements of the LOS-MIMO radio link is, according to an aspect of the disclosure, determined prior to executing the present method, for instance by lab measurements using a representative radio link hardware set-up.

The method also comprises the step of predicting S8 the LOS-MIMO radio link performance by comparing the LOS-MIMO radio link operating condition to the operating condition requirements of the LOS-MIMO radio link.

Thus, it is possible to beforehand, i.e., prior to deployment of the radio link, establish or at least estimate whether a given LOS-MIMO radio link deployment will fulfill the set of operating condition requirement imposed on the radio link.

According to an aspect, the method further comprises the step of obtaining S1 a first set of parameters comprising a radio link transmit power and a radio link propagation distance, and wherein the SISO radio link operating condition is determined based on the first set of parameters.

This first set of parameters constitutes input to, e.g., a SISO attenuation model and a SISO availability model.

According to an aspect, the method also comprises the step of obtaining S4 a second set of parameters comprising a LOS-MIMO phase difference distribution, and the step of calculating S5 the LOS-MIMO incremental gain is based on the LOS-MIMO phase difference distribution.

According to an aspect, the determined SISO radio link operating condition comprises a SISO receive signal power distribution, and the LOS-MIMO radio link operating condition comprises a LOS-MIMO receive signal power distribution.

According to an aspect, the set of operating condition requirements of the LOS-MIMO radio link comprises a table of LOS-MIMO radio link throughput values with corresponding required receive power values.

Consequently, the method allows for determining whether a planned LOS-MIMO radio link deployment will support a pre-determined required throughput or if the planned LOS-MIMO radio link deployment is flawed and cannot be expected to meet requirements imposed on the deployment.

According to an aspect, the method further comprises determining an expected outage of the LOS-MIMO radio link by comparing the LOS-MIMO radio link operating condition to the operating condition requirements of the LOS-MIMO radio link.

According to an aspect, the method comprises using S9 the predicted LOS-MIMO radio link performance to determine an expected outage of the LOS-MIMO radio link.

According to an aspect, the second set of parameters comprises an antenna geometry of the LOS-MIMO radio link.

A characteristic of the radio link surroundings which, according to some aspects of the disclosure, is used for determining LOS-MIMO system gain is the refractivity of the surrounding environment. The concept of refractivity is related to the fact that propagation of radio signals in the troposphere do not follow a straight line between the transmitter and the receiver. Instead, the propagation path can be bent or refracted depending on the current atmospheric conditions along the trajectory. This propagation condition can be characterized by the so called refractivity index. This index is height dependent and can be estimated using meteorological data of temperature, air pressure and water vapour pressure. In practice, the vertical refractivity gradient, which is a quotient given by the difference in refractivity and the difference in the height, is also frequently used to characterize the propagation condition. For example, a transmitted microwave signal will follow the curvature of the earth, as long as the vertical refractivity gradient is below a pre-determined value. This is also known as a ducting condition wherein transmitted signals are trapped within a layer of air which acts as a waveguide.

Consequently, according to an aspect, either or both of the first and second set of parameters comprises either of weather pattern data and refractivity data of the LOS-MIMO radio link, the weather pattern data comprising at least one out of rain pattern data, wind pattern data, and snow pattern data.

According to an aspect, the weather pattern data further comprises data on temperature, air pressure and water vapour pressure.

According to an aspect, the step of calculating S5 the LOS-MIMO incremental gain is based on either or both of the weather pattern data and the refractivity data of the LOS-MIMO radio link.

According to an aspect, the method also comprises the step of measuring S3 at least one representative phase difference distribution of at least one representative radio link site, and wherein the step of obtaining S4 a second set of parameters comprises processing the at least one representative phase difference distribution to obtain the LOS-MIMO phase difference distribution.

Suitable apparatus for carrying out the step of measuring is described below in connection to FIG. 6.

Figure 3:
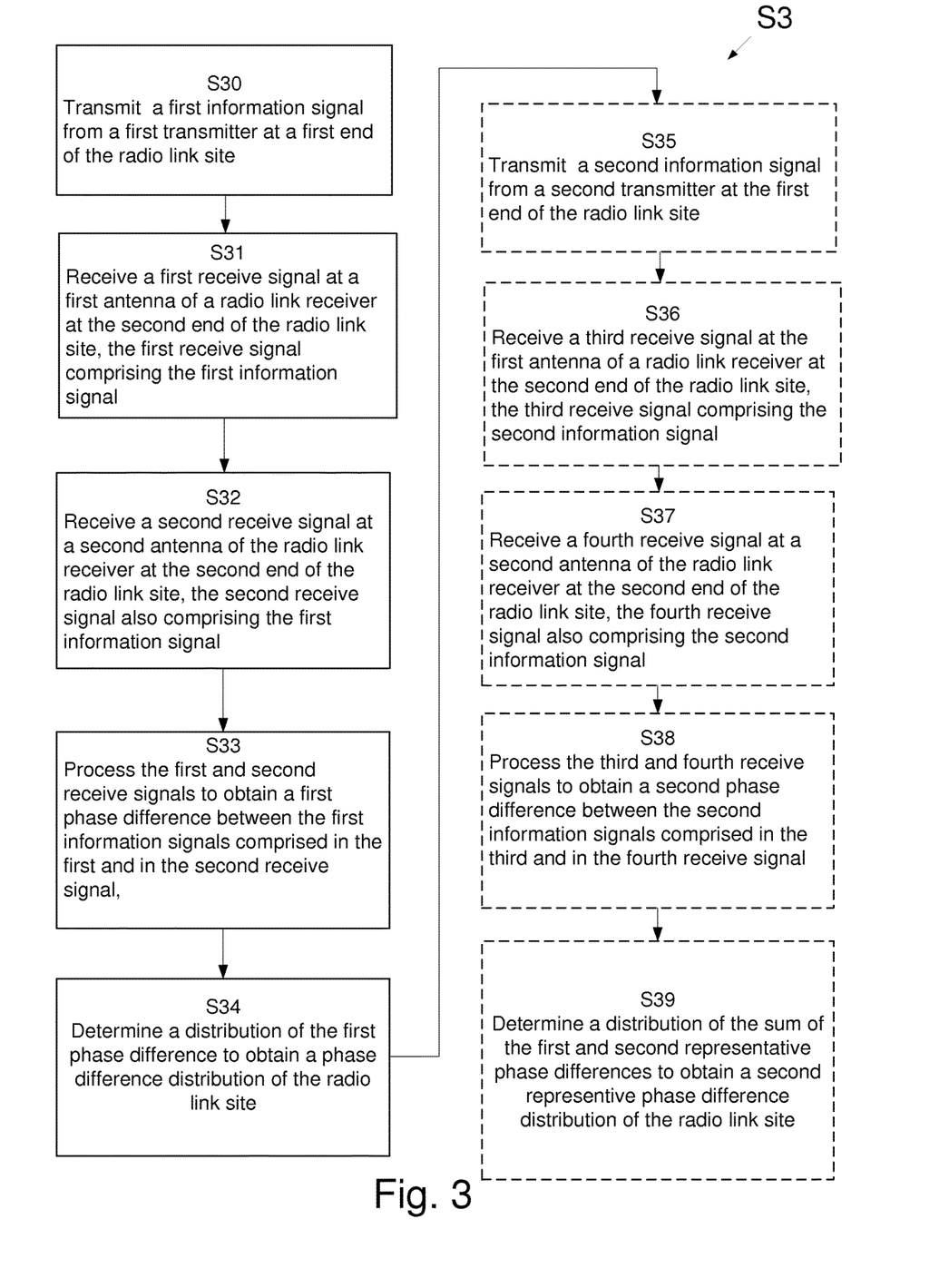

FIG. 3 illustrates an aspect of the step of measuring S3. Accordingly, the step of measuring S3 further comprising the steps of transmitting S30 a first information signal from a first transmitter at a first end of the radio link site, and receiving S31 a first receive signal at a first antenna of a radio link receiver at a second end of the radio link site. Here, the first receive signal comprises the first information signal. The method also comprises the step of receiving S32 a second receive signal at a second antenna of the radio link receiver at the second end of the radio link site, the second receive signal also comprising the first information signal, and processing S33 the first and second receive signals to obtain a first representative phase difference between the first information signals comprised in the first and in the second receive signal. The method further comprises the step of determining S34 a distribution of said first representative phase difference to obtain a representative phase difference distribution of the radio link site.

A key benefit of the aspect of the step of measuring S3, shown in FIG. 3, is that the representative phase difference distribution is obtained with a minimum of impact from phase noise in transmitters and receivers.

According to an aspect, the step of measuring S3 also comprises the steps of transmitting S35 a second information signal from a second transmitter at the first end of the radio link site, and also receiving S36 a third receive signal at the first antenna of the radio link receiver at the second end of the radio link site, the third receive signal comprising the second information signal. The method also comprises the steps of receiving S37 a fourth receive signal at the second antenna of the radio link receiver at the second end of the radio link site, the fourth receive signal also comprising the second information signal, and processing S38 the third and fourth receive signals to obtain a second representative phase difference between the second information signals comprised in the third and in the fourth receive signal. The method further comprises the step of determining S39 a distribution of the sum of the first and second representative phase differences to obtain a second representative phase difference distribution of the radio link site.

Figure 4:
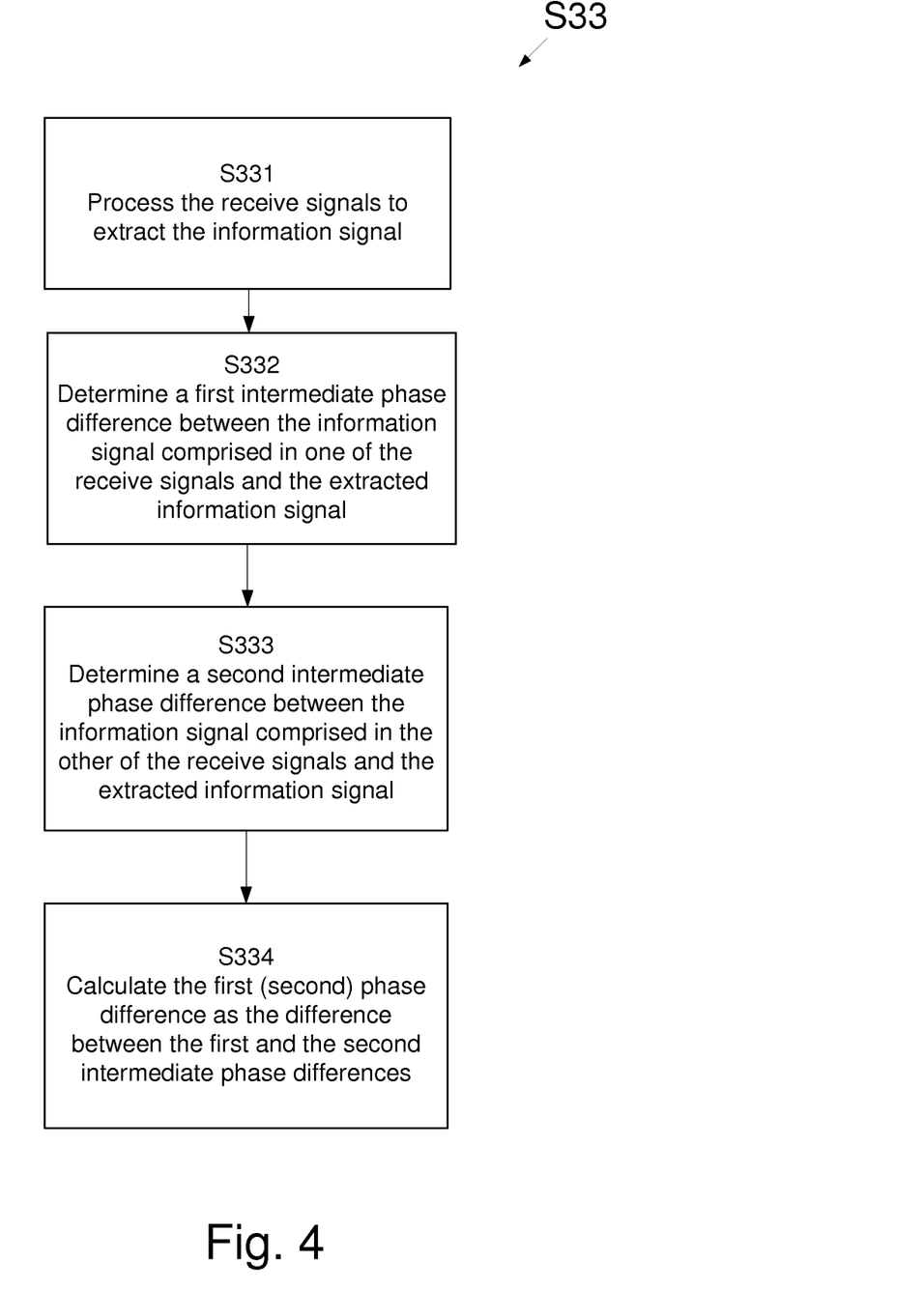

FIG. 4 illustrates a further aspect of the step of measuring S3. Accordingly, the method further comprises using the first and second receive signals, or the third and fourth receive signals, as receive signals, and also using the first or second information signal as an information signal, and wherein the step of processing S33, S38 further comprises processing S331 the receive signals to extract the information signal, and determining S332 a first intermediate phase difference between the information signal comprised in one of the receive signals and the extracted information signal, as well as determining S333 a second intermediate phase difference between the information signal comprised in the other of the receive signals and the extracted information signal, and also calculating S334 the first or second representative phase difference, respectively, as the difference between the first and the second intermediate phase differences.

Figure 5:
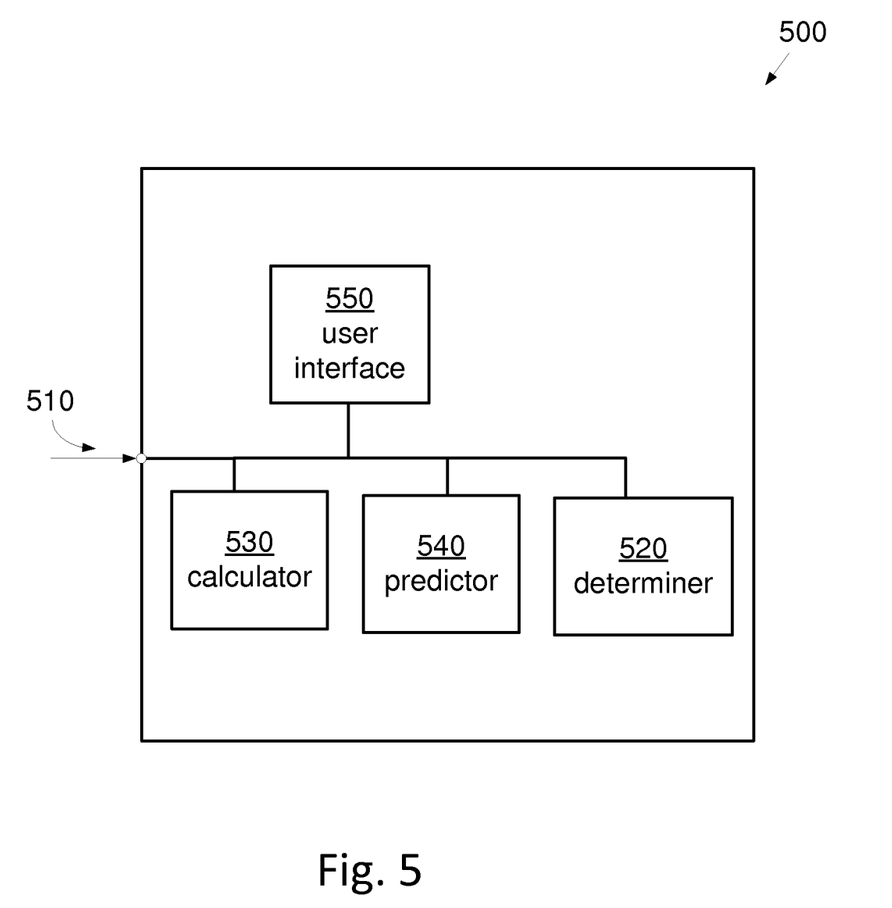

FIG. 5 shows a block diagram schematically illustrating a tool 500 for predicting the performance of a Line-Of-Sight, LOS, multiple-input multiple-output, MIMO, radio link. The tool 500 comprises a determiner unit 520 arranged to determine a single-input single-output, SISO, radio link operating condition comprising a SISO system gain.

According to an aspect, the SISO radio link operating condition determined by the determiner unit 520 is determined according to a statistical SISO attenuation model.

The tool 500 further comprises a calculator unit 530 arranged to calculate a LOS-MIMO incremental gain.

According to an aspect, the LOS-MIMO incremental gain is determined based on a representative phase difference distribution and according to the principles discussed in relation to FIG. 1b above. Thus, the determined LOS-MIMO incremental gain is according to some aspect of the disclosure a distribution of LOS-MIMO incremental gain.

According to an aspect, the LOS-MIMO incremental gain distribution is determined based on a statistical model of LOS-MIMO phase difference.

The determiner unit 530 is further arranged to determine a LOS-MIMO radio link operating condition comprising a LOS-MIMO system gain based on the LOS-MIMO incremental gain. The tool 500 is also arranged to obtain a set of operating condition requirements of the LOS-MIMO radio link via an input interface 510 of the tool 500.

The tool 500 also comprises a predictor unit 540 arranged to predict the LOS-MIMO radio link performance by comparing the LOS-MIMO radio link operating condition to the operating condition requirements of the LOS-MIMO radio link.

Thus, the tool 500 can be used to plan the deployment of a LOS-MIMO radio link, i.e., to evaluate before actual installation if the planned deployment will fulfill requirements on, e.g., received signal power, outage and throughput. Towards this end, the tool 500 shown in FIG. 5 also comprises a user interface 550 for interacting with a user of the tool.

According to an aspect, the determiner unit 530 is further arranged to determine the LOS-MIMO radio link operating condition comprising the LOS-MIMO system gain by accounting for the calculated LOS-MIMO incremental gain in the SISO system gain to obtain the LOS-MIMO system gain.

According to an aspect, the LOS-MIMO system gain is determined by convolving a probability density function of the LOS-MIMO gain by a probability density function According to an aspect, the tool 500 is arranged to also obtain a first set of parameters via the input interface 510, the first set of parameters comprising a radio link transmit power and a radio link propagation distance, and wherein the determiner unit 520 is arranged to determine the single-input single-output, SISO, radio link operating condition based on the first set of parameters.

According to an aspect, the SISO radio link operating condition comprises a SISO attenuation model.

According to an aspect, the tool 500 is further arranged to also obtain a second set of parameters via the input interface 510, the second set of parameters comprising a LOS-MIMO phase difference distribution, and wherein the calculator unit 530 is arranged to calculate a distribution of the LOS-MIMO incremental gain, a LOS-MIMO incremental gain distribution, based on the LOS-MIMO phase difference distribution.

According to an aspect, the tool 500 is further arranged to assist in the deployment of a radio link network by using, in the predictor unit 540, the predicted LOS-MIMO radio link performance to determine an expected outage of at least one LOS-MIMO radio link.

Figure 6:
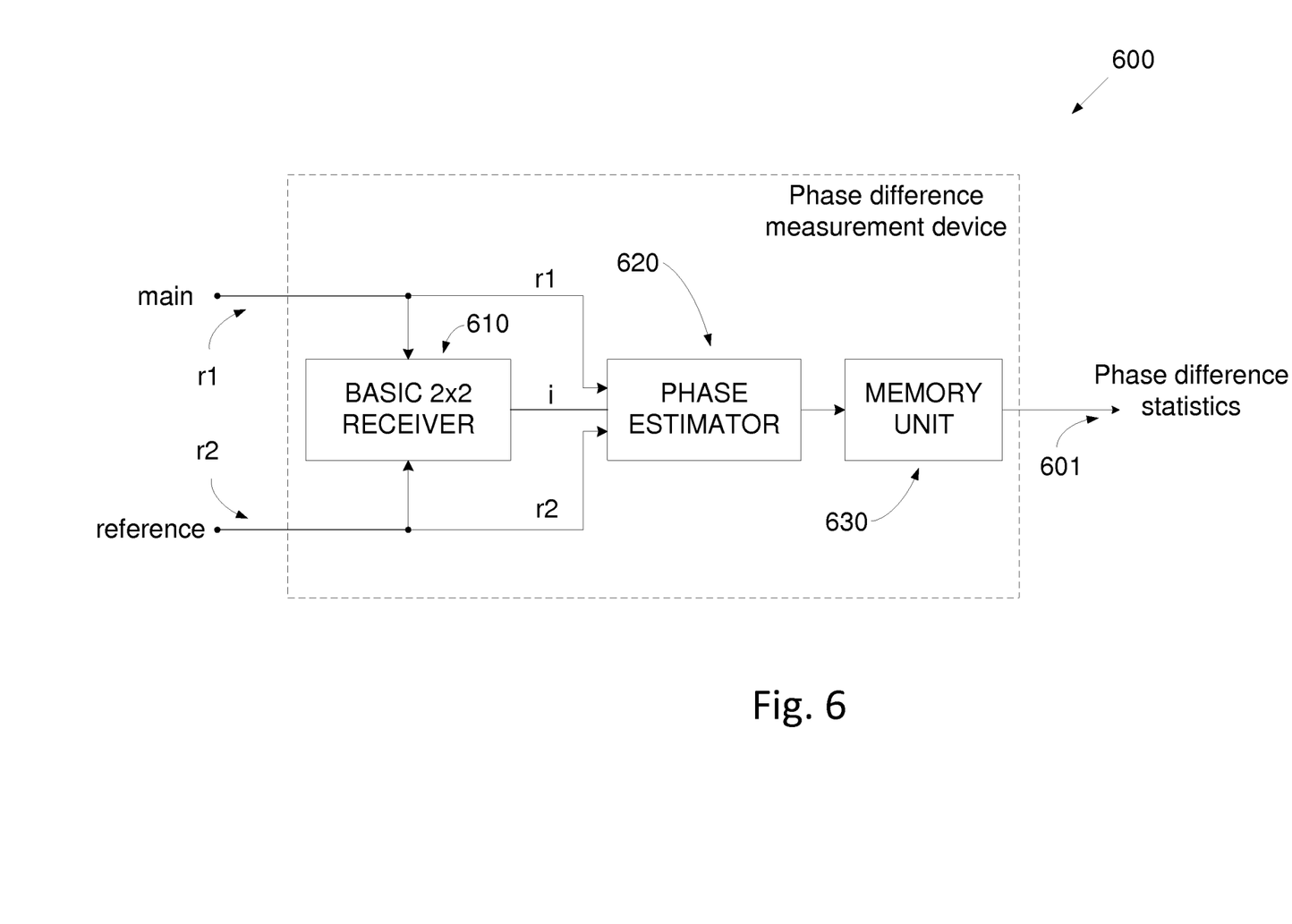
FIG. 6 schematically shows a block diagram of a device for measurement of phase difference.

FIG. 6 shows a phase difference measurement device 600 for measuring representative LOS-MIMO phase difference statistics. The disclosed phase difference measurement device 600 is suitable for gathering phase difference statistics from which the representative phase difference distribution can be extracted.

The device 600 uses a basic 2×2 LOS-MIMO interference cancelling receiver 610 arranged to receive a main signal r1 from a first antenna and to also receive a reference signal r2 from a second antenna, and to generate an interference free information signal i by processing received signals r1 and r2. The interference free information signal i is input to a phase estimator device 620 together with the received signals r1 and r2 which have been received at the two antennas connected to the LOS-MIMO receiver. The phase estimator device 620 estimates a LOS-MIMO phase difference and outputs the estimated phase difference to a memory unit 630 which stores LOS-MIMO phase differences sampled over time. Based on such stored phase differences a set of representative phase difference statistics are output 601 from the phase difference measurement device 600.

Examples of such statistics include the probability density function, PDF, of the estimated LOS-MIMO phase difference.

The phase estimator unit 620 shown in FIG. 6 estimates a phase difference between propagation paths from a transmitter antenna to (in this case) the two receiver antennas. This is done using projection functions and low-pass filtering. I.e., by calculating the complex valued correlation between the information signal i, and the main signal r1, and comparing the angle of said correlation to a corresponding correlation angle calculated between the information signal i and the reference signal r2.

Thus, phase noise in the main r1 and reference signals r2 will not distort the representative LOS-MIMO phase difference statistics, as both r1 and r2 have been generated in part by the same transmitter, and the information signal i has been processed to be free from distortion.

According to an aspect, the phase difference measurement device 600 shown in FIG. 6 is integrated in a LOS-MIMO radio link modem.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The invention claimed is:

1. A method for predicting the performance of a Line-Of-Sight, LOS, multiple-input multiple-output, MIMO, radio link, the method comprising the steps of;
   determining a single-input single-output, SISO, radio link operating condition comprising a SISO system gain,
   calculating a LOS-MIMO incremental gain of the LOS-MIMO radio link,
   modifying the determined SISO radio link operating condition by accounting for the calculated LOS-MIMO incremental gain in the SISO system gain to obtain a LOS-MIMO radio link operating condition comprising a LOS-MIMO system gain,
   obtaining a set of operating condition requirements of the LOS-MIMO radio link,
   prior to deployment of the LOS-MIMO link, predicting the LOS-MIMO radio link performance by comparing the LOS-MIMO radio link operating condition to the operating condition requirements of the LOS-MIMO radio link; and
   deploying the LOS-MIMO link based on predicting the LOS-MIMO radio link performance.

2. The method of claim 1, further comprising the step of obtaining a first set of parameters comprising a radio link transmit power and a radio link propagation distance, and wherein the SISO radio link operating condition is determined based on the first set of parameters.

3. The method of claim 1, further comprising the step of obtaining a second set of parameters comprising a LOS-MIMO phase difference distribution, and wherein the step of calculating the LOS-MIMO incremental gain comprises calculating a LOS-MIMO incremental gain distribution based on the LOS-M IMO phase difference distribution.

4. The method of claim 1, wherein the determined SISO radio link operating condition comprises a SISO receive signal power distribution, and wherein the LOS-MIMO radio link operating condition comprises a LOS-MIMO receive signal power distribution.

5. The method of claim 1, wherein the set of operating condition requirements of the LOS-MIMO radio link comprises a table of LOS-MIMO radio link throughput values with corresponding required receive power values.

6. The method of claim 1, further comprising determining an expected outage of the LOS-MIMO radio link by comparing the LOS-MIMO radio link operating condition to the operating condition requirements of the LOS-MIMO radio link.

7. The method of claim 1, wherein the second set of parameters comprises an antenna geometry of the LOS-MIMO radio link.

8. The method of claim 1, wherein at least one of the first and second set of parameters comprises either of weather pattern data or refractivity data of the LOS-MIMO radio link, the weather pattern data comprising at least one out of rain pattern data, wind pattern data, and snow pattern data.

9. The method of claim 8, wherein the step of calculating the LOS-MIMO incremental gain distribution is based on at least one of the weather pattern data and the refractivity data of the LOS-MIMO radio link.

10. The method of claim 3, further comprising the step of measuring at least one representative phase difference distribution of at least one representative radio link site, and wherein the step of obtaining a second set of parameters comprises processing the at least one representative phase difference distribution to obtain the LOS-MIMO phase difference distribution.

11. The method of claim 10, wherein the step of measuring further comprises the steps of;
   transmitting a first information signal from a first transmitter at a first end of the radio link site,
   receiving a first receive signal at a first antenna of a radio link receiver at a second end of the radio link site, the first receive signal comprising the first information signal,
   receiving a second receive signal at a second antenna of the radio link receiver at the second end of the radio link site, the second receive signal also comprising the first information signal, processing the first and second receive signals to obtain a first representative phase difference between the first information signals comprised in the first and in the second receive signal, determining a distribution of said first representative phase difference to obtain a representative phase difference distribution of the radio link site.

12. The method of claim 11, wherein the step of measuring further comprises the steps of;

transmitting a second information signal from a second transmitter at the first end of the radio link site, receiving a third receive signal at the first antenna of the radio link receiver at the second end of the radio link site, the third receive signal comprising the second information signal, receiving a fourth receive signal at the second antenna of the radio link receiver at the second end of the radio link site, the fourth receive signal also comprising the second information signal, processing the third and fourth receive signals to obtain a second representative phase difference between the second information signals comprised in the third and in the fourth receive signal, determining a distribution of the sum of the first and second representative phase differences to obtain a second representative phase difference distribution of the radio link site.

13. The method according to claim 12, further comprising using the first and second receive signals, or the third and fourth receive signals, as receive signals, and also using the first or second information signal as an information signal, and wherein the step of processing further comprises processing the receive signals to extract the information signal, determining a first intermediate phase difference between the information signal comprised in one of the receive signals and the extracted information signal, determining a second intermediate phase difference between the information signal comprised in the other of the receive signals and the extracted information signal, calculating the first or second representative phase difference, respectively, as the difference between the first and the second intermediate phase differences.

14. A tool for predicting the performance of a Line-Of-Sight, LOS, multiple-input multiple-output, MIMO, radio link, the tool comprising:

a processor arranged to:
    determine a single-input single-output, SISO, radio link operating condition comprising a SISO system gain,
    calculate a LOS-MIMO incremental gain, and
    determine a LOS-MIMO radio link operating condition comprising a LOS-MIMO system gain based on the LOS-MIMO incremental gain, and
an input interface configured to obtain a set of operating condition requirements of the LOS-MIMO radio link
wherein, prior to deployment, the processor is further arranged to predict the LOS-MIMO radio link performance by comparing the LOS-MIMO radio link operating condition to the operating condition requirements of the LOS-MIMO radio link.

15. The tool of claim 14, wherein the processor is further arranged to determine the LOS-MIMO radio link operating condition comprising the LOS-MIMO system gain by accounting for the calculated LOS-MIMO incremental gain in the SISO system gain to obtain the LOS-MIMO system gain.

16. The tool of claim 14 wherein:
the input interface is further configured to obtain a first set of parameters, the first set of parameters comprising a radio link transmit power and a radio link propagation distance,
the processor is arranged to determine the single-input single-output, SISO, radio link operating condition based on the first set of parameters; and
the tool further comprising a user interface arranged for interacting with a user of the tool.

17. The tool of claim 14, wherein:
the input interface is configured to also obtain a second set of parameters comprising a LOS-MIMO phase difference distribution, and
the processor is arranged to calculate a distribution of the LOS-MIMO incremental gain based on the LOS-MIMO phase difference distribution, and to use said LOS-MIMO incremental gain distribution as the LOS-MIMO incremental gain.

18. The tool according to claim 14, wherein the processor is further configured to assist in the deployment of a radio link network by using the predicted LOS-MIMO radio link performance to determine an expected outage of at least one LOS-MIMO radio link.

* * * * *